United States Patent [19]
Bai

[11] Patent Number: 5,686,205
[45] Date of Patent: Nov. 11, 1997

[54] BISMUTH BASED ELECTRODES FOR ELECTROCHEMICAL CELLS

[75] Inventor: Lijun Bai, Vernon Hills, Ill.

[73] Assignee: Motorola, Inc., Schaumburg, Ill.

[21] Appl. No.: 537,064

[22] Filed: Sep. 29, 1995

Related U.S. Application Data

[62] Division of Ser. No. 222,776, Apr. 4, 1994, Pat. No. 5,480,744.

[51] Int. Cl.$^6$ ........................................... H01M 4/58
[52] U.S. Cl. ............................... 429/218; 252/182.1
[58] Field of Search ...................... 429/218; 252/182.1

[56] References Cited

U.S. PATENT DOCUMENTS

| | | | |
|---|---|---|---|
| 4,302,520 | 11/1981 | Evans et al. | 429/221 X |
| 4,546,057 | 10/1985 | Broussely et al. | 429/218 |
| 4,675,260 | 6/1987 | Sakurat et al. | 429/218 |
| 4,950,560 | 8/1990 | Tarcy | 429/27 |
| 5,105,053 | 4/1992 | Jacobson et al. | 423/593 X |
| 5,389,469 | 2/1995 | Passaniti et al. | 252/182.1 |
| 5,503,930 | 4/1996 | Maruyama et al. | 429/218 X |
| 5,516,604 | 5/1996 | Mieczkowska et al. | 429/218 X |

FOREIGN PATENT DOCUMENTS 59-223210  12/1984  Japan .................. 423/415.1

*Primary Examiner*—John S. Maples
*Attorney, Agent, or Firm*—Kenneth M. Massaroni

[57] ABSTRACT

An electrochemical, bismuth containing charge storage material and electrochemical cells (10) having an electrode (20) comprising the material. The charge storage material has the composition: $Bi_xX_yM_z$ where Bi is bismuth, M and X are modifiers and x, y, and z represent the relative proportion of each component.

8 Claims, 7 Drawing Sheets

BISMUTH BASED ELECTRODES FOR ELECTROCHEMICAL CELLS

This is a divisional application of U.S. patent application Ser. No. 08/222,776 filed on Apr. 4, 1994, now U.S. Pat. No. 5,480,744, and assigned to Motorola, Inc.

TECHNICAL FIELD

This invention relates to electrochemical charge storage materials, and rechargeable electrochemical cells using such materials.

BACKGROUND

There has recently been a great deal of interest in developing better and more efficient materials for storing energy for applications such as radio communication, satellites, portable computers, and electric vehicles, to name but a few. Accordingly, there have been recent concerted efforts to develop high energy, cost effective battery cells having improved performance characteristics. Electrochemical battery cells are preferred and hence are widely used in these applications since the chemical reactions which take place in the cells can be converted into useful electrochemical energy.

An electrochemical battery cell uses its reactive components, namely the anode and cathode, to generate an electric current. The electrodes are separated from one another by an electrolyte which maintains a simultaneous flow of ionic conduction between the two electrodes. Electrons flow from one electrode through an external circuit to the other electrode completing the circuit. Rechargeable, or secondary, cells are more desirable than primary (non-rechargeable) cells since the associated chemical reactions are reversible. Accordingly, electrodes for secondary cells must be capable of being regenerated (i.e., recharged) many times. The development of advanced rechargeable cells depends on the design and selection of appropriate materials for the electrodes and the electrolyte.

Currently, materials selected for use as the anode in rechargeable electrochemical cells are fairly limited. Typically, most rechargeable electrochemical cells use either cadmium or a combination of three or more materials in a so-called metal hydride system, as the anode. However, both of these commonly used systems have shortcomings. For example, cadmium while widely accepted in the marketplace, has certain environmental issues associated with it. Specifically, cadmium is a highly toxic material and is difficult to dispose of. In fact, several countries have recently adopted legislation aimed at eliminating the use of cadmium in rechargeable cells.

Metal hydrides are environmentally benign, but have certain technological problems relating to performance. For example, cycle life (i.e. the number of times the cell can be discharged and charged) in the best metal hydride systems is typically less than 500 cycles, and normally approximately 300 cycles. In addition to relatively short cycle life, other problems such as short shelf life, hydrogen outgassing, and high internal pressures are inherent in the system and are difficult to overcome.

Accordingly, there exists a need to develop a new electrode material for rechargeable electrochemical systems, which is environmentally friendly, yet overcomes the limitation of prior art systems.

SUMMARY OF THE INVENTION

In accordance with the invention there is provided a multi-component material for reversibly electrochemically storing and releasing an electrical charge. The material consists of bismuth and at least one modifier element. The modifier element is selected from the group of materials consisting of carbon, nickel, iron, oxygen, hydrogen, sulfur, phosphorus, fluorine, chlorine, bromine, iodine, manganese, magnesium, tin, cobalt, aluminum, zinc, copper, graphite, teflon, and combinations thereof.

Also according to the invention there is provided an electrode and an electrochemical cell, such as a battery or a pseudocapacitive device fabricated with an electrode having the material described hereinabove.

DETAILED DESCRIPTION OF THE PREFERRED EMBODIMENT

Figure 1:
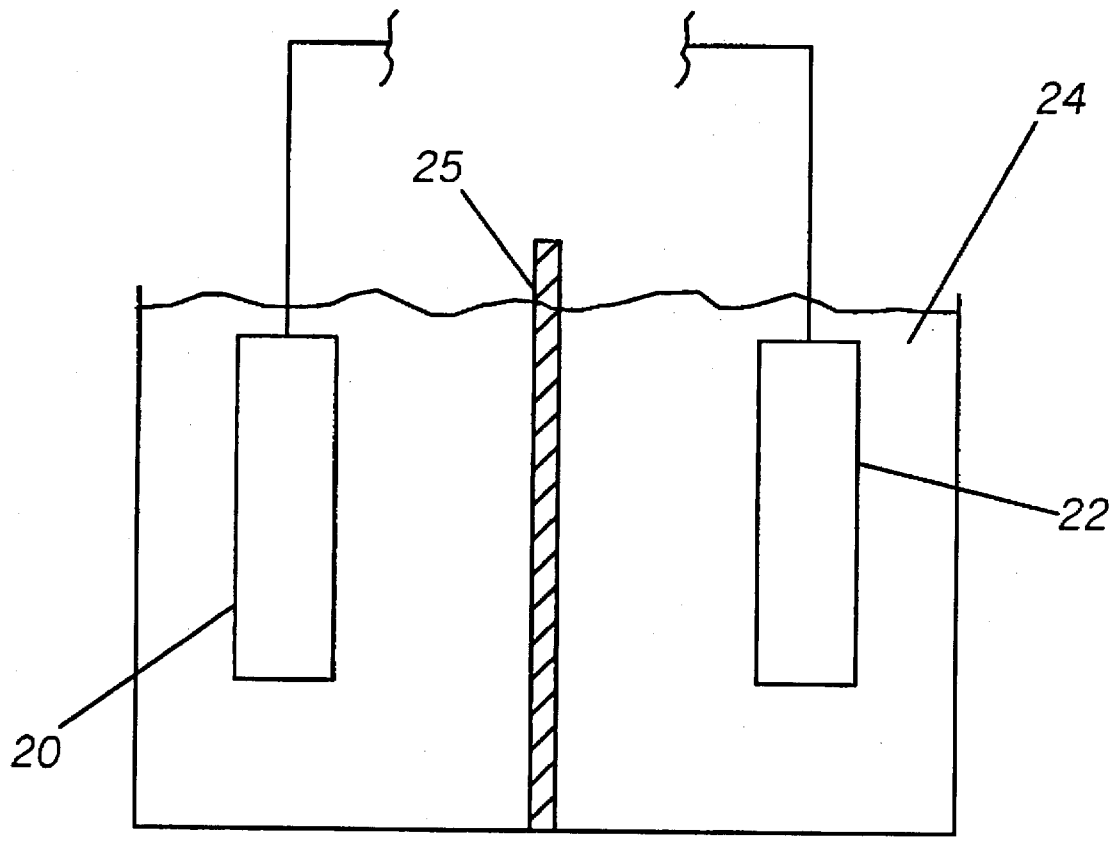
FIG. 1 is a schematic illustration of an electrochemical cell employing a bismuth containing electrode in accordance with the present invention.

While the specification concludes with claims defining the features of the invention that are regarded as novel, it is believed that the invention will be better understood from consideration of the following description in conjunction with the drawing figures in which like reference numerals are carried forward.

The battery of the present invention is a basic and unique approach to the problem of efficient electrical energy storage. The charge storage materials described herein have obtained relatively high density energy storage, efficient reversibility, and high electrical efficiency, without substantial structural change. The materials also have long cycle life and deep discharge capability. The improved, rechargeable, charge storage material includes bismuth and at least one modifier. The modifier may be selected from the group of materials including oxygen, hydrogen, sulfur, phosphorous, fluorine, chlorine, bromine, iodine, carbon, iron, manganese, magnesium, tin, cobalt, aluminum, zinc, copper, graphite, teflon, and combinations thereof.

The rechargeable charge storage material may have the following formula:

$Bi_xX_yM_z$ wherein Bi is bismuth, X is a first modifier selected from the group of oxygen, hydrogen, sulfur, phosphorus, fluorine, chlorine, bromine, iodine, carbon, or combinations thereof; M is a modifier selected from the group of C, Ni, Fe, Mn, Mg, Sn, Co, Al, Zn, Cu, graphite, teflon and combinations thereof. x, y, and z identify the amount of each component in the material, and are typically in the following ranges:

x is between 1 and 4;
y is between 0 and 7;
z is between 0 and 5.

Employing a bismuth and modifier electrode as described hereinabove, the electrode reaction at the anode of an electrochemical cell would be as follows:

$$Bi_2O_3 + 3H_2O + 6e^- \rightleftharpoons 2Bi + 6OH^-$$

or $$Bi(OH)_3 + 3e^- \rightleftharpoons Bi + 3OH^-$$

Referring now to FIG. 1, there is illustrated therein an electrochemical cell 10 including an anode 20 in accordance with the instant invention, a cathode 22 and an electrolyte 24 disposed there between. The electrochemical cell 10 includes an anode 20 having the chemical composition $Bi_xX_yM_z$ wherein X and M are modifier elements such as those described above, and x, y, and z specify the relative amount of each component in the material. The other electrode, i.e., the cathode 30, may be fabricated of materials electrochemically appropriate for use in an electrochemical cell having a bismuth-based anode. Examples of these materials include: NiOOH, AgO, $PbO_2$, $Br_2$, $O_2$ and combinations thereof.

Operatively disposed between the anode 20 and the cathode 22 is an electrolyte 24. The electrolyte may be either an aqueous or non-aqueous electrolyte and may also function as a separator to physically isolate the anode and cathode from one another. Examples of appropriate aqueous electrolytes for use in this system include KOH, NaOH, $Na_2CO_3$, NaCl, $H_2SO_4$, KF and combinations thereof. Examples of appropriate non-aqueous electrolytes for use in this system include $LiAlCl_4$, $LiClO_4$, $LiPF_6$, propylene carbonates, ethylene carbonates and combinations thereof. In cases in which the electrolyte is an aqueous electrolyte, a separator 25 may also be necessary in order to isolate the anode and cathode from one another. In this instance, an appropriate separator may be cellophane, woven or filtered nylon, polyvinyl acetate (PVA), microporous polypropylene, and combinations thereof.

Preparation of a bismuth-based electrode as contemplated herein begins by mixing operative amounts of a bismuth-containing precursor, such as Bi powder, with a sufficient amount of a modifier or binder material, such as, for example, a graphite powder or teflon suspension in an appropriate aqueous solution. The resulting paste may then be rolled to an appropriate thickness and dried. The powder sheet may then be pressed on to a nickel mesh, or other current collector. Preparation of the charge storage material may be better understood from the following examples.

EXAMPLE I

An electrode in accordance with the instant invention was prepared as described below: 1.20 grams of bismuth powder (99.99% Adrich, −100 mech) was mixed with 1.20 grams of carbon in the form of graphite powder (LONZA, KS-6, average size is 6 μm). Thereafter, 0.20 grams of teflon suspension (Dupont 60%) and a small amount of a water/isopropanol (3:1) solution was added to the powder mixture. The resulting paste was rolled out to a thickness of approximately 0.4 mm. The teflon-bonded Bi/C powder sheet was dried in air, at room temperature for approximately 12 hours. The material was then cut into small pieces of approximately 1 $cm^2$ each. The weight of each of two samples was approximately 0.1659 g, with 0.075 grams of Bi. The two samples were then pressed onto a nickel mesh (Exmit, NI 5.5-4/OFA) using a lab press. The nickel mesh served as the counter electrode, with the bismuth-based electrodes serving as the working electrode, and Hg/HgO as the reference electrode. A 30% KOH solution was used as the electrolyte. A large volume fraction of graphite was used in the electrode to achieve fast potential sweep rates, however, it is to be understand that much lower graphite contents could also be used.

Figure 2:
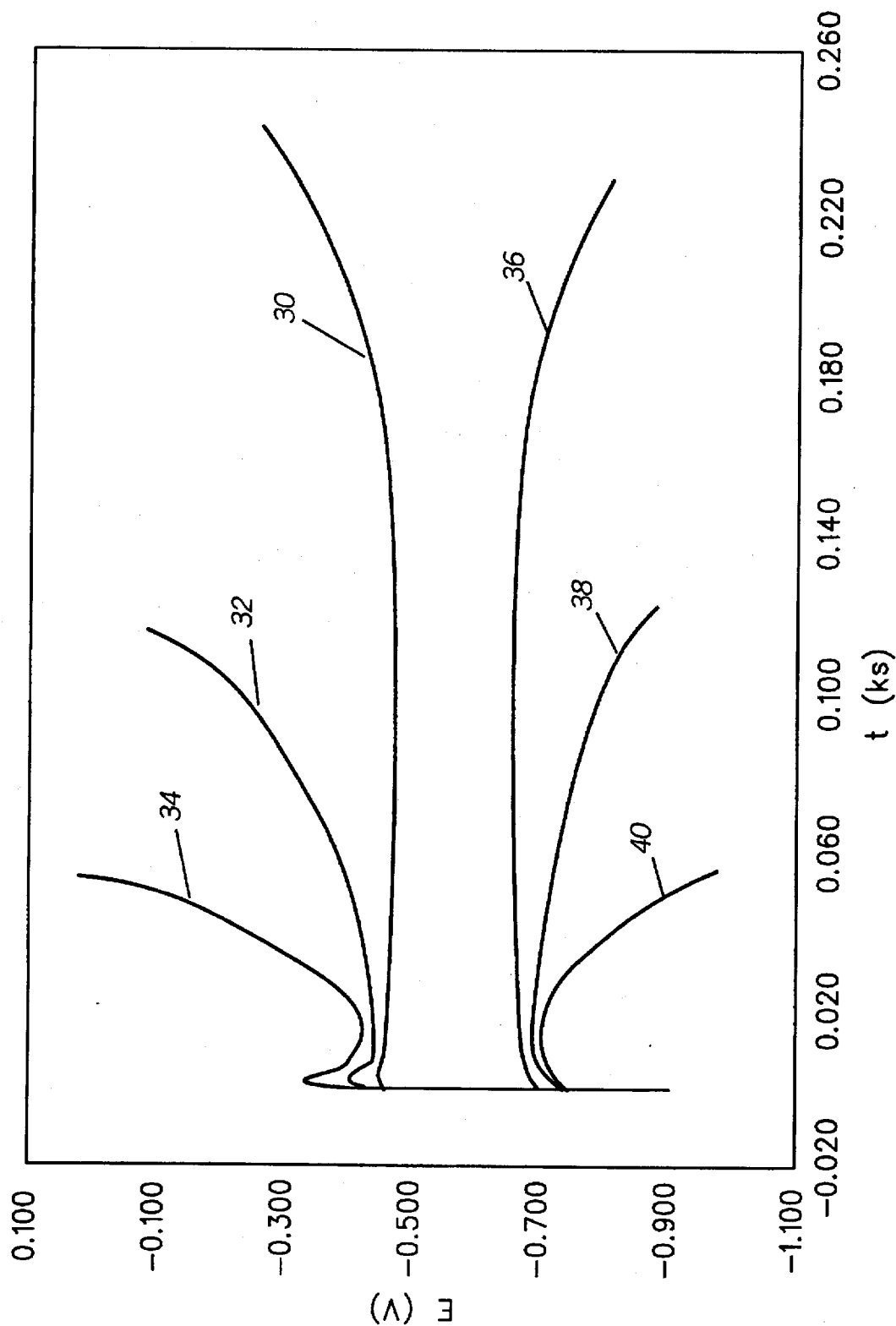
FIG. 2 is a plot of charge/discharge curve for an electrode in accordance with the instant invention.

Referring now to FIG. 2, there is illustrated therein constant current discharge curves 30, 32, & 34 and charge curves 36, 38, 40 showing experimental results for the Bi/C electrode at current densities: 0.05 A $cm^{-2}$ (0.67 A/g Bi), 0.1 A $cm^{-2}$ (1.33 A/g Bi), and 0.4 A $cm^{-2}$ (5.3 A/g Bi) for curves 30 and 36, 32 and 38, and 34 and 40 respectively. These results indicate that the Bi electrode has a very flat discharge/recharge curve over a full potential range. This will result in a very stable working potential (about −0.5 V vs. Hg/HgO at 0.1 A $cm^{-2}$) for the total three electron discharge. The small gap (about 0.2 V) between charge and discharge curves in FIG. 2 suggests the low polarization character for the Bi electrode. Another important characteristic of the bismuth-based electrode is its capability for high rate charge and discharge, over 5 A/gram of Bi as shown in FIG. 2.

Figure 3:
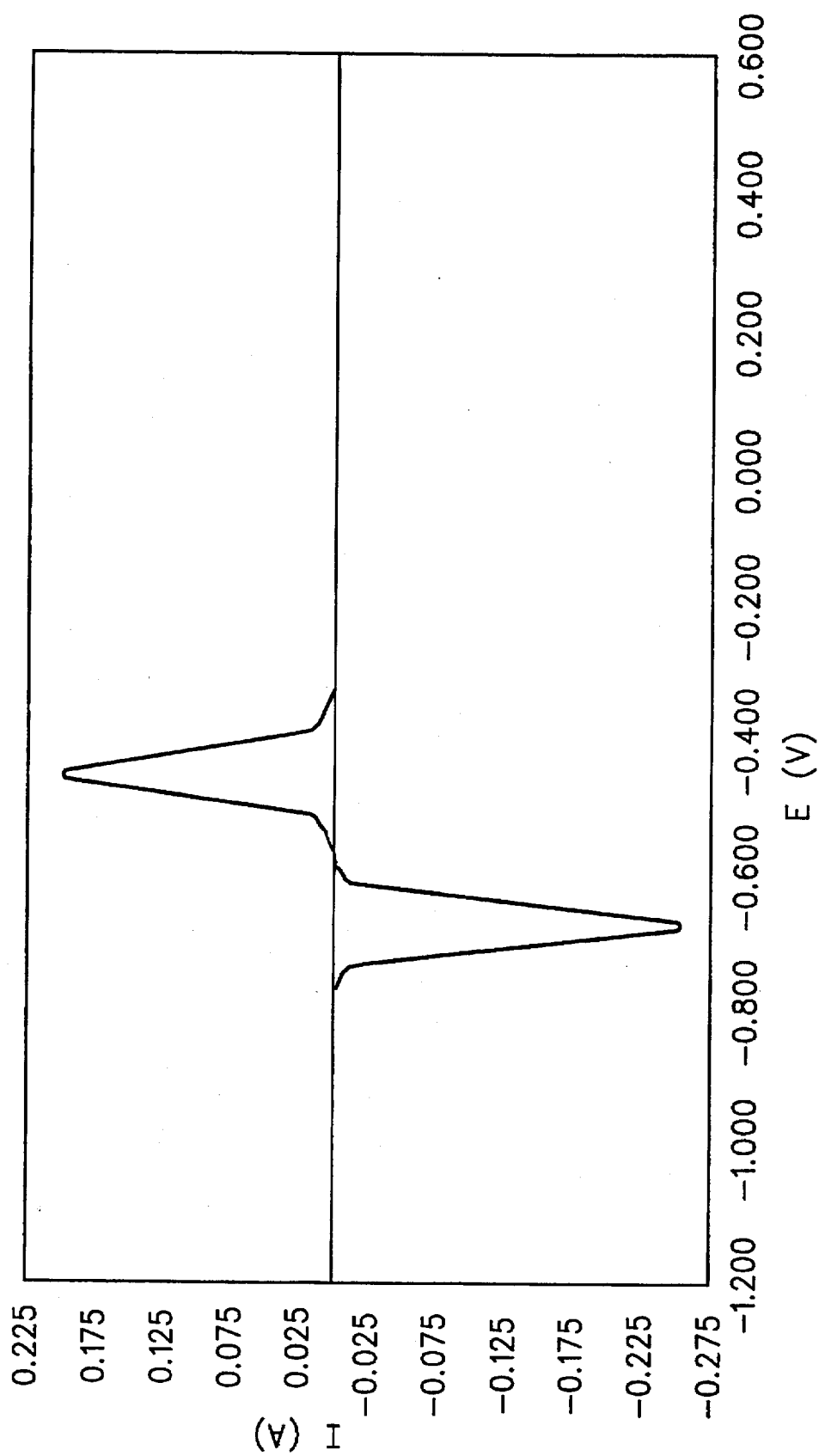
FIG. 3 is a cyclic voltammagram (CV) for a Bi/C electrode in accordance with the instant invention.

FIG. 3. shows cyclic voltammagram (CV) experimental results for the Bi/C electrode at a potential sweep rate of 1 mV/s. The peak area for both cathode and anode directions is substantially the same. This result suggests that the Bi-based electrode has a substantially 100% current efficiency and that there is no hydrogen gassing such as occurs in a metal hydride electrode. This is a unique characteristic which yields a much simpler cell structure than traditional Ni/Cd and Ni/MH batteries.

EXAMPLE II

A second example in which a Bi/C electrode was prepared is described herein. Electrode fabrication began by mixing 0.1 grams of Bi powder (99.99% Aldrich, −100 mesh) with 0.90 grams of graphite powder (LONZA, KS-6). Thereafter, 0.085 grams of teflon suspension (Dupont, 60%) and a small amount of water/isopropanol (3:1) solution was added to the powder mixture. The Bi/C electrode (contained about 0.0090 grams of Bi) and electrochemical cell were made according to the procedure as described hereinabove with respect to Example I. A large volume fraction of graphite was used in the electrode to achieve fast potential sweep rates, however, it is to be understood that much lower graphite contents could also be used (for the same reason, a large volume fraction of graphite was also used in Examples III and IV).

Figure 4:
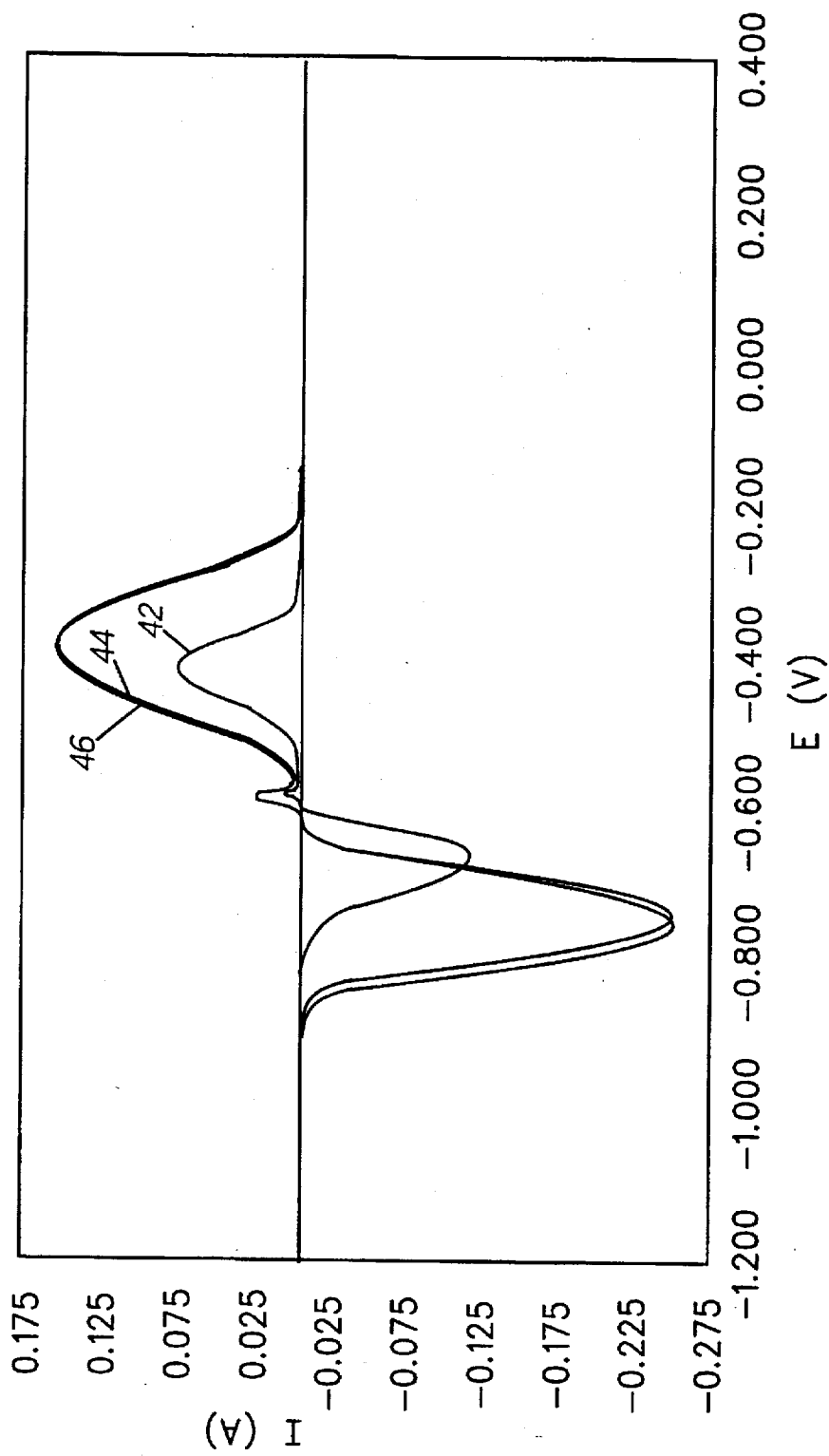
FIG. 4 is CV for a Bi/C electrode, taken at the 10th, 2000th and 3000th cycle in accordance with the invention.
Figure 5:
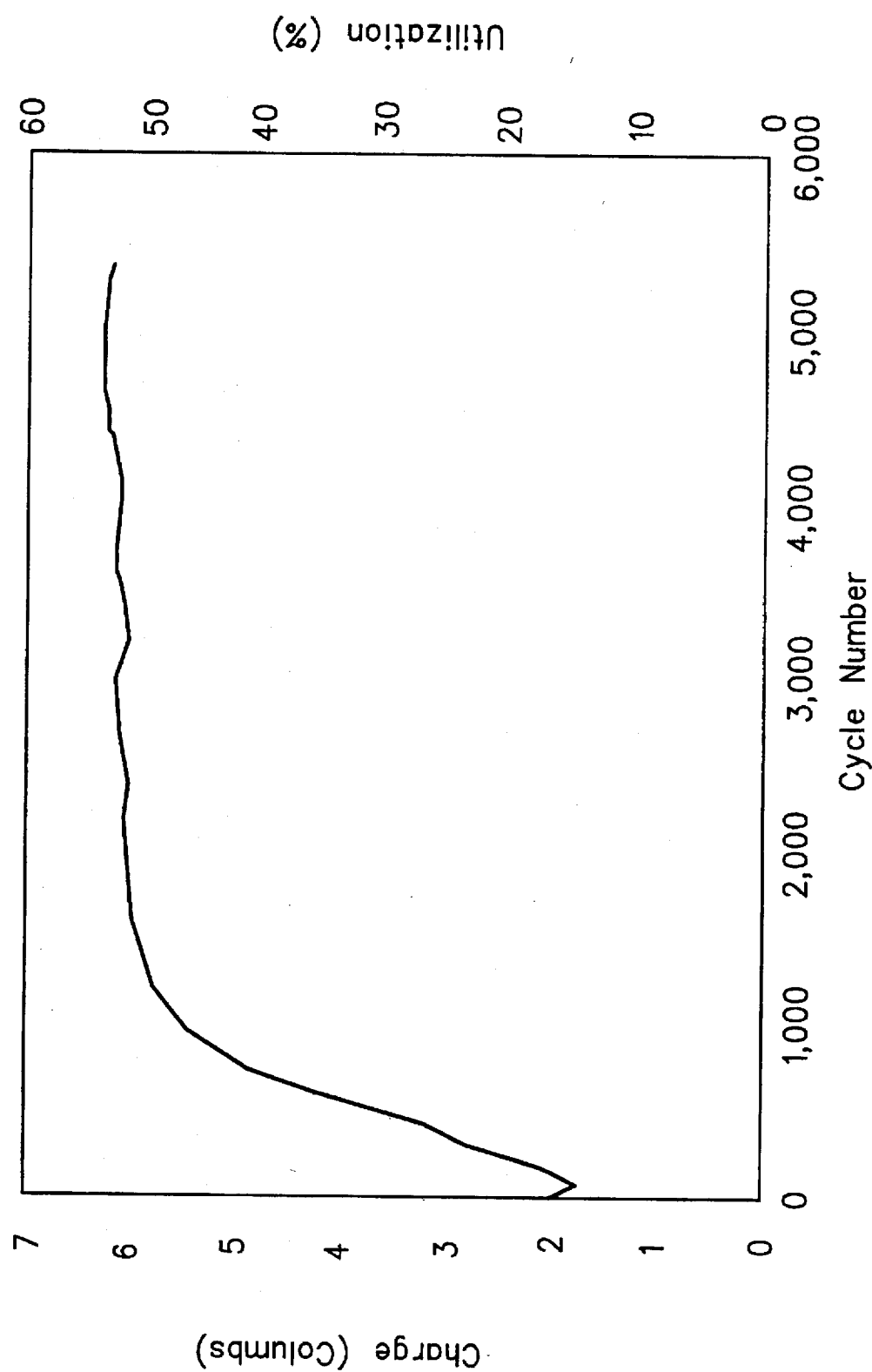
FIG. 5 illustrates the electrode capacity and utilization versus cycles for a Bi/C electrode in accordance with the invention.

FIG. 4 shows CV experimental results at the 10th (line 42), 2000th (line 44) and 3000th (line 46) cycles, respectively, for the Bi/C electrode at a potential sweep rate of 5 mV/s in 30% KOH solution. FIG. 5 shows the electrode capacity (Coulomb) and utilization (%) vs. cycle number plot for the Bi/C electrode. The utilization results are calculated based on three electron transfer per Bi atom.

The Bi/C electrode was cycled 5500 cycles without degradation (see FIG. 5). During the first 2000 cycles, the charges associated with the electrochemical reaction increased in both cathodic and anodic directions, and leveled off thereafter. The percent utilization increased from about 15% to over 50% within this initial 2000 cycles period. It is hypothesized that this conditioning period appeared because the size of bismuth powder used in the present example was fairly large, approximately 150 μm (−100 mesh), therefore, it took a large number of cycles to establish an equilibrium condition between bismuth and its reaction product. This hypothesis was confirmed by the experiments described in Example III, in which, a much smaller powder size (about 1.9 μm) of $Bi_2O_3$ was used and utilization is over 90% from the first cycle.

A very long cycle life (>5000) is one of the unique aspects of a bismuth anode. It is a great improvement over the current rechargeable anodes, e.g. Cd and MH, which are limited to a few hundred cycles.

EXAMPLE III

An electrode in accordance with the instant invention was prepared by mixing 0.1 grams of $Bi_2O_3$ powder (99.9%

FERRO, average size 1.9μ) with 1.0 grams of carbon in the form of graphite powder (LONZA, KS-6). Thereafter, 0.085 grams of teflon suspension (Dupont 60%) and a small amount of a water/isopropanol (3:1) solution was added to the powder mixture. The resulting paste was rolled out to a thickness of approximately 0.4 mm. The teflon-bonded $Bi_2O_3/C$ powder sheet was dried in air, at room temperature for approximately 12 hours. The material was then cut into small pieces of approximately 1 cm² each. The weight of the two samples was approximately 0.1034 g, with 0.00885 grams of $Bi_2O_3$. Two samples were then pressed onto a nickel mesh (Exmit, NI 5.5-4/OFA) using a lab press. The nickel mesh served as the counter electrode, with the bismuth-based electrode serving as the working electrode, and Hg/HgO as the reference electrode. A 30% KOH solution was used as the electrolyte. A large volume fraction of graphite was used in the electrode to achieve fast potential sweep rates, however, it is to be understand that much lower graphite contents could also be used.

Figure 6:
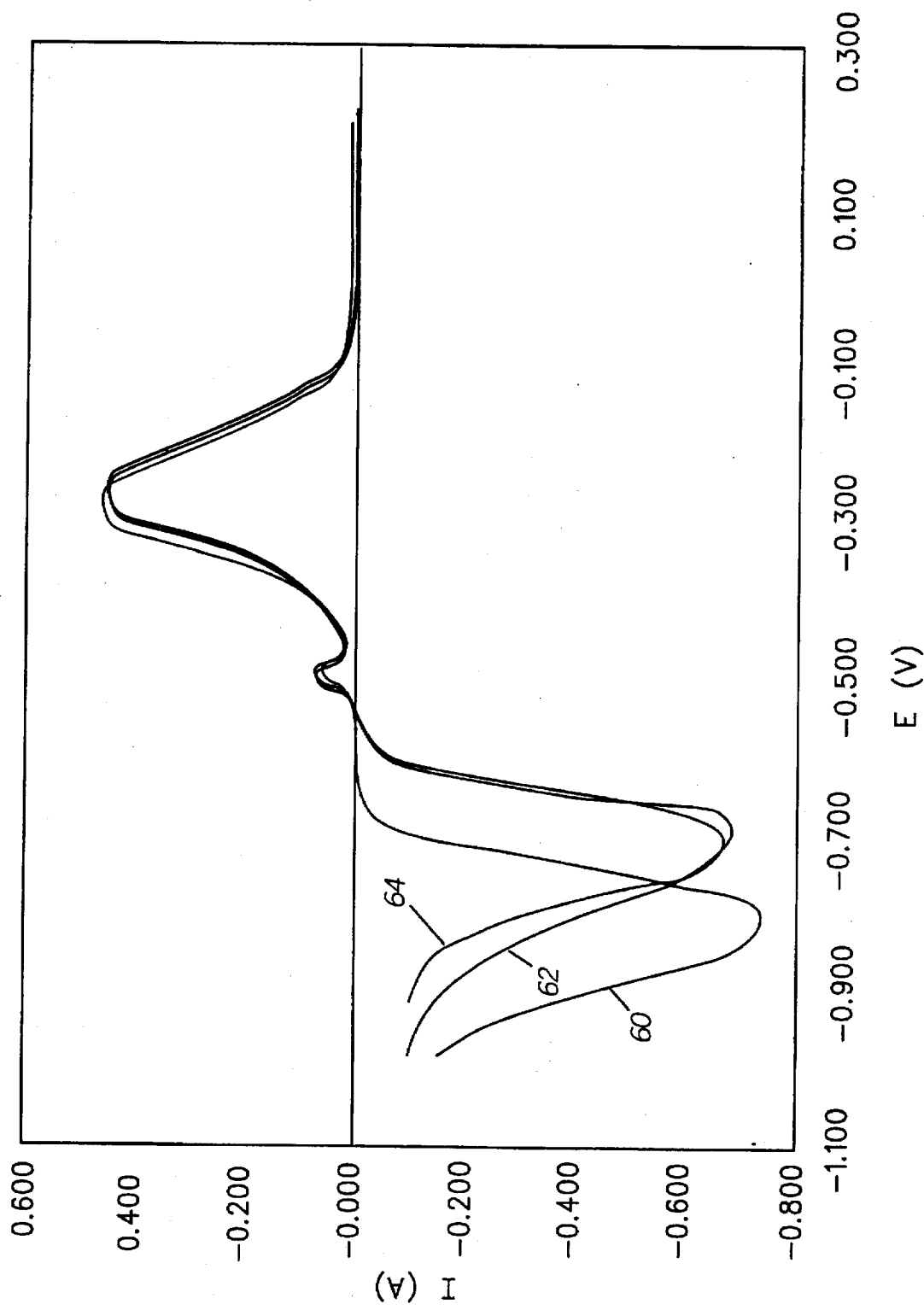
FIG. 6 is a cyclic voltammagram illustrating the results for a $Bi_2O_3/C$ electrode in accordance with the instant invention.

Referring now to FIG. 6, there is illustrated therein a cyclic voltammagram for the $Bi_2O_3/C$ electrode at potential sweep rates of 10 mV per second for first, 60, second, 62, and 50th, 64, cycles for the bismuth electrode. Table 1 below presents data calculated from FIG. 6.

TABLE 1

UTILIZATION VS. CYCLE NUMBER
OF THE $Bi_2O_3$ ELECTRODE

| | COULOMB/C | UTILIZATION (%) |
|---|---|---|
| Theoretical (3e⁻) | 11.0 | — |
| First cycle | 12.8 | 116 |
| Second cycle | 9.96 | 90.5 |
| 50th cycle | 8.65 | 78.6 |
| 1000 cycle | 8.30 | 75.5 |

Over 100% utilization was obtained in the first cycle due to the slight amount of hydrogen produced in the first cycle manifested by a shift of curve 60 of FIG. 6 to the negative side. Following the second cycle, the bismuth electrode reached its best performance level. After 1000 cycles (not shown in FIG. 6), the bismuth electrode still maintained a 75% utilization. $Bi_2O_3$ may be a preferred starting material for a bismuth anode because it may be considered to be in a fully "discharged" state. It can be conveniently combined with a cathode, e.g. nickel electrode, which also starts in a fully "discharged" state, $(Ni(OH)_2)$. Bismuth is a heavy metal (atomic weight 209), however, it gives three electron per Bi atom. A comparison of theoretically and practically specific capacity for several anode materials is presented in Table 2.

Table 2

Comparison of theoretical and practical specific capacities of Bi, Cd and MH materials:

| | Theoretical (Ah/g) | Practical (Ah/g) |
|---|---|---|
| Bi | 0.385 | 0.35* |
| Cd | 0.48 | 0.20 |
| MH | (0.25–0.30) | 0.275 |

*Based on the present experimental data (90% utilization).

Table 2 shows that the bismuth anode has 1.75 and 1.27 times higher practical specific capacities than cadmium and metal hydride anodes, respectively. The high capacity along with the high rate capability and long cycle life shown above will result in a battery having long cycle life, high energy, and high power densities.

EXAMPLE IV

Another example in which a Bi/Fe/C electrode was prepared is described herein. Electrode fabrication began by mixing 0.1 g of bismuth powder (Aldrich, −100 mesh, 99.99%) with 0.1 g of iron powder (Aldrich, particle size ~10μ, 99.9%) and 0.8 g of graphite powder (LONZA, KS-6), and appropriate amounts of binder and water/isopropanol solution as described hereinabove with respect to Example I. The charge storage material was dried and cut in small samples also as described hereinabove with respect to Example I.

Figure 7:
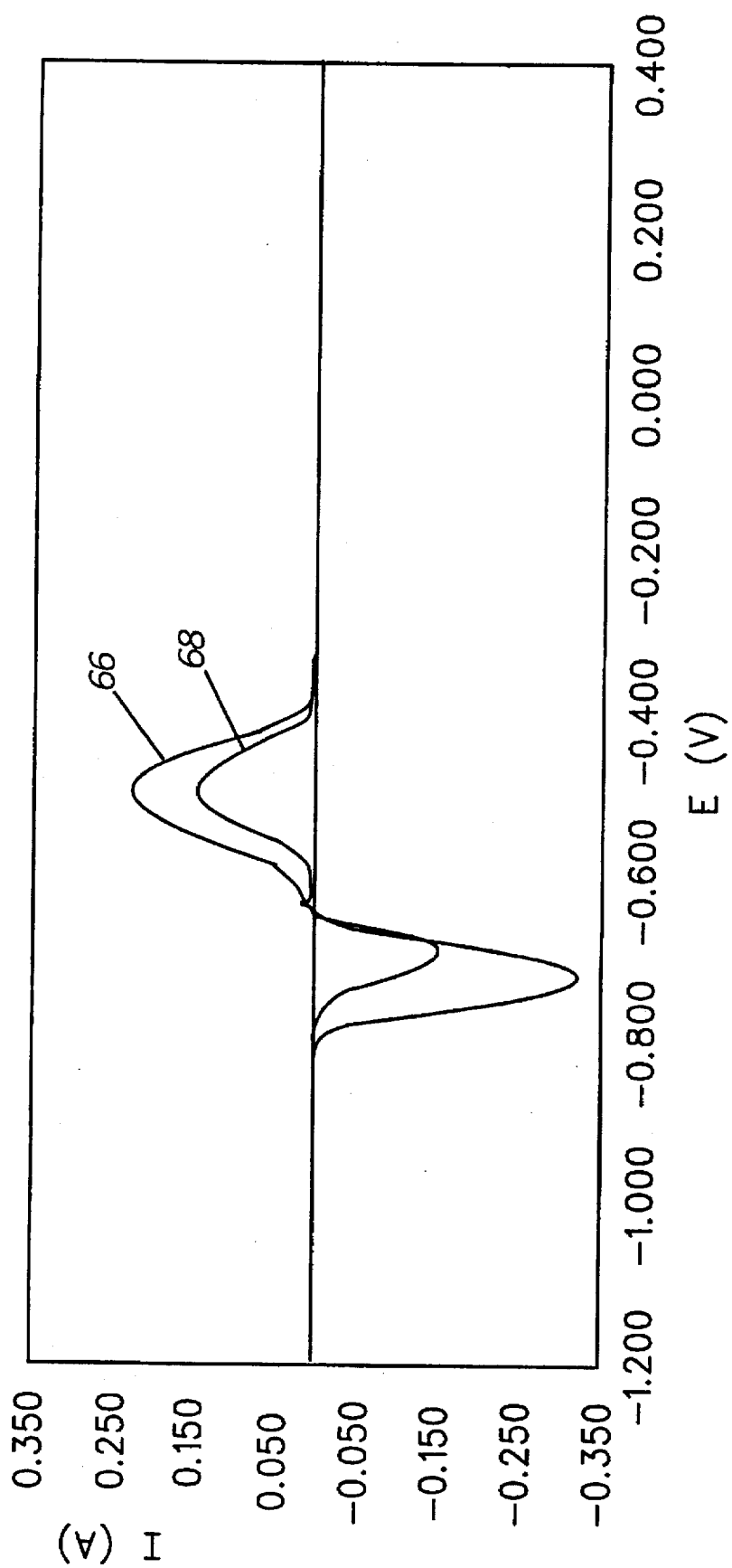
FIG. 7 is a cyclic voltammagram illustrating results for a Bi/Fe/C electrode prepared in accordance with the instant invention.

FIG. 7 illustrates the CV profile for the Bi/Fe/C electrode curve 66 and a Bi/C electrode curve 68 at approximately 5 mV/s, after 2000 cycles for both electrodes. Curve 68 in FIG. 7 is for the Bi/C material as prepared and described in Example I and II. It may be appreciated from FIG. 7 that the Bi/Fe/C electrode has much higher utilization (~80%) than the Bi/C electrode (52%). No peaks in curve 66 of FIG. 7 can be identified as the contribution of iron; however, the presence of iron appears to cause a higher utilization in the bismuth material. An iron/carbon electrode was tested separately. The results confirmed that iron alone did not contribute any significant current under the present conditions.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A rechargeable electrochemical cell electrode comprising a multi-component material for reversibly electrochemically storing and releasing an electrical charge, said material including bismuth, and at least one modifier element selected from the group consisting of C, O, H, Fe, graphite, and combinations thereof.

2. An electrode as in claim 1, wherein said modifier is C.

3. An electrode in claim 2, wherein the ratio of bismuth to modifier is between about 1:10 to 10:1.

4. An electrode as in claim 3, wherein the ratio of bismuth to modifier is approximately 1:1.

5. An electrode as in claim 1, wherein said modifier comprises Fe, and graphite.

6. An electrode as in claim 5, wherein said ratio of bismuth to modifier is 10:1, and wherein the ratio of Fe to graphite is 0.1 to 1.

7. An electrode as in claim 1, wherein said modifier comprises O and C, and wherein said material is $Bi_2O_3/C$.

8. An electrode as in claim 1, wherein said modifier comprises O and H and wherein said material is $Bi(OH)_3$.

* * * * *